July 23, 1935.  G. LORELLI  2,008,833

STABILITY INDICATOR FOR AEROPLANES

Filed Aug. 21, 1933

INVENTOR
Gennaro Lorelli
BY
ATTORNEY

Patented July 23, 1935

2,008,833

UNITED STATES PATENT OFFICE 2,008,833

STABILITY INDICATOR FOR AEROPLANES

Gennaro Lorelli, New York, N. Y.

Application August 21, 1933, Serial No. 686,098

1 Claim. (Cl. 33—215)

The object of the present invention is to provide a visible indicator adapted to be mounted upon the instrument board of an aeroplane or in some other position relative to the pilot's seat as to be readily available, which indicator, preferably in the form of an aeroplane representation, will show the position of the plane as to banking and forward and downward inclinations at all times, without the necessity of employing gyroscopes or other electrical or mechanically operated driving means for the indicator, the specific object being to provide means of great simplicity and sureness of action, and, at the same time, pictorial, i. e., by the representation of the plane, form of indicator to enable the pilot to judge the position of the plane at a glance, such an indicator being particularly desirable when the plane is in fog or clouds, or flying at night.

The invention will be described with reference to the accompanying drawing, in which Fig. 1 is an elevation of the operative members of an embodiment of the invention in the preferred position, facing the observer.

Figure 1:
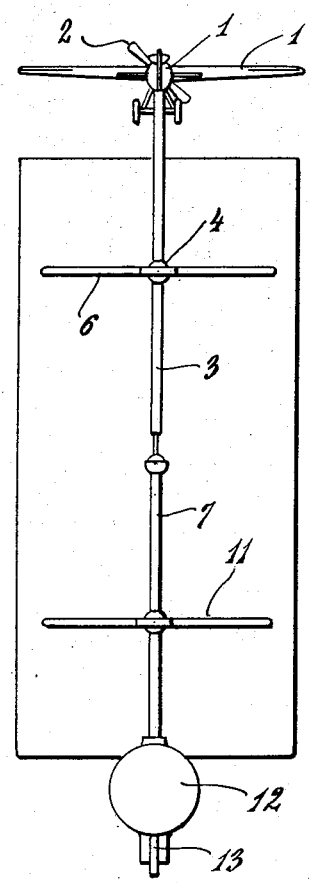
Figure 2:
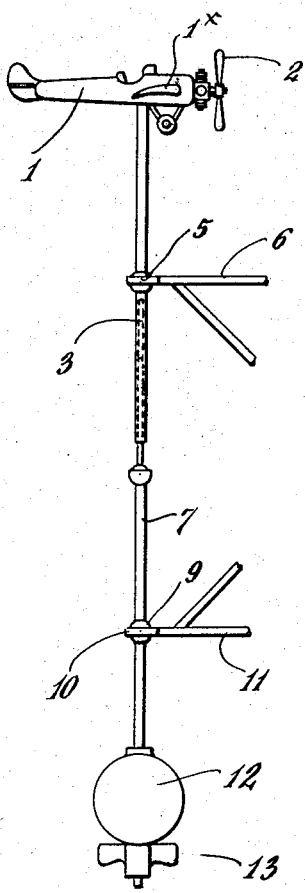
Fig. 2 is a view of the elements illustrated in Fig. 1, in side elevation.

Referring to the drawing, I is an indicator in the shape of a tiny aeroplane having wings $1x$ and a propeller 2, the position of the propeller rearmost of the aeroplane indicator showing that the indicator is mounted in the same direction as the aeroplane itself.

The rear face of the wings is preferably coated with a radium paint so as to be observable independently of exterior light, so that should the illumination within the plane be impaired, the indicator still will be visible to the pilot.

I prefer that the top of the indicator be pigmented with a color distinct from the bottom of the wing or entire lower structure of the indicator. For example, the top of the wing structure may be painted red and the bottom of the wing structure may be painted green, this being for a purpose hereinafter described.

The plane-formed indicator is carried at the top of a hollow tube-like rod 3, the rod 3 carrying centrally thereof a ball 4 mounted in the socket 5 of a bracket-holding arm 6. Below rod 3 is an actuating lever 7 which is connected to rod 3 at 8 through the instrumentality of a ball and socket joint, the ball being carried by a pin disposed within the hollow rod and movable longitudinally thereof. Midway of its length, lever 7 carries a ball 9 forming part of a fulcrum arrangement comprising the socket member 10 of a bracket arm 11 and the ball itself.

At its lower end, lever 7 carries a ball weight 12 which may be held in place by wing nut 13 threaded upon the end of lever 7 and forming a means for adjusting the position of the weight relatively to the lever.

Figure 3:
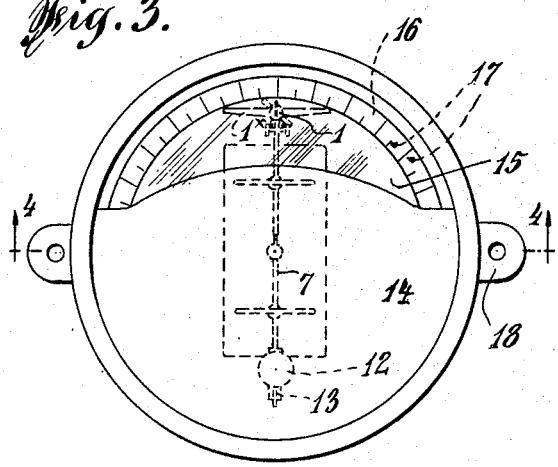
Fig. 3 is a front face elevation of an embodiment of the invention mounted in a dial-like enclosure.
Figure 4:
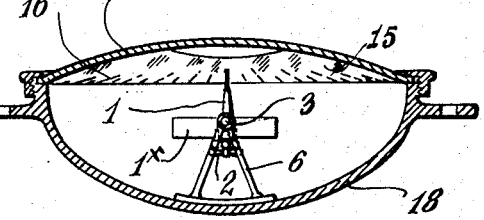
Fig. 4 is a sectional elevation on the line 4—4, Fig. 3, looking in the direction of the arrows.

The indicator and operating structure as a whole may be, if desired, mounted within a glass-enclosed dial frame such as illustrated at 18 in Figs. 3 and 4. In Fig. 4, I have shown the lower portion of the dial covered with an opaque wall 14, the upper covering being a glass 15, (Fig. 3).

In the operation of the device, the tiny aeroplane indicator will be caused to move in accordance with the movement of the aeroplane itself. For example, if the aeroplane banks to the left, ball 12, through the action of gravity, will likewise swing to the left on its fulcrum support and lever 7 will act upon rod 3 to move the indicator in the arc of a circle, visibly showing the pilot the exact position of the aeroplane. In the banking of the aeroplane to the right, the reverse action of the indicator will be secured. Should the aeroplane nose up, ball 12 will move toward the pilot, assuming that the dial 15 is facing the pilot. This action of the ball will cause lever 7 to move the lower end of rod 3 rearwardly and the tiny indicator will be moved in a forwardly extending arc so that when the indicator is substantially in the horizontal line of vision, meeting the eye of the operator, the vivid coloring of the top of the wing will be markedly apparent. Should the aeroplane nose downwardly, a reverse movement of the indicator will ensue and the vivid coloring of the lower wing of the indicator will become apparent to the pilot, the width of the color indicating to the pilot the degree of downward inclination of the front wing surface of the aeroplane being driven.

In the dial mounting rearwardly of the tiny plane indicator, may be placed a dial 16 having markings thereon as shown at 17 by which the exact degree of banking inclination to the left or to the right of horizontal, may be read, the horizontal line of the preferably opaque covering 14 will greatly aid instant reading independently of the dial markings.

It will be understood that various modifications may be made in the form and arrangement of the elements comprising the embodiment illustrated in the drawing, without departing from the spirit of the invention.

What I claim and desire to secure by Letters Patent, being as follows:

A stability indicator for aeroplanes comprising an annular casing having a semi-spherical rear wall formed with a peripheral seat, a transparent facing member carried by said seat, an opaque shield supported on said seat and of such area as to expose, through said transparent facing, an upper section of the casing interior, an indicator member in the form of a miniature aeroplane carried at the upper portion of the casing, a bracket carried by the rear wall of the casing, an arm having universal connection with said bracket intermediate its length and carrying the said indicator, a second arm having universal connection with a second bracket carried by the rear wall of the casing and having universal connection with the first-named arm and a weight carried at the lower end of the second arm within the casing and adapted to move contiguous the rear wall of the casing in transverse directions, the relative positions of the brackets, arms, weight and casing adapting the latter for such position that the miniature aeroplane is moved across the facing member with the latter supported in a vertial plane.

GENNARO LORELLI